Oct. 23, 1934.  G. JOHNSON  1,978,087
SNAP FASTENER STUD
Filed Jan. 5, 1931
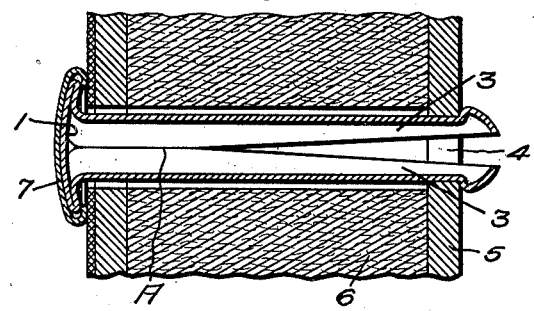
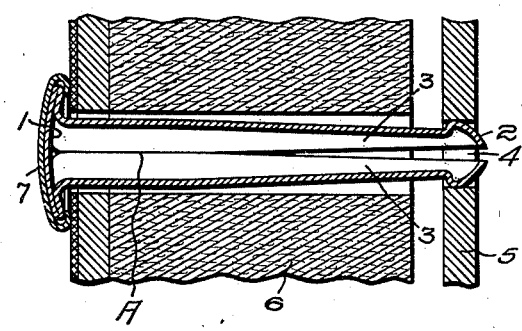
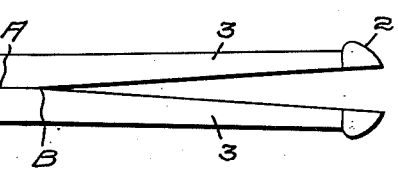
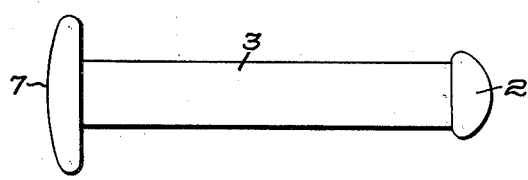
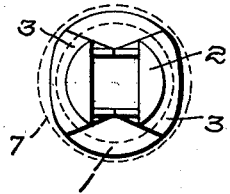
Inventor:
Gustav Johnson
by Emery, Booth, Varney & Townsend
Attys Patented Oct. 23, 1934

1,978,087

UNITED STATES PATENT OFFICE 1,978,087

SNAP FASTENER STUD

Gustav Johnson, West Roxbury, Mass., assignor to United-Carr Fastener Corporation, Cambridge, Mass., a corporation of Massachusetts Application January 5, 1931, Serial No. 506,544

2 Claims. (Cl. 85—5)

My invention aims to provide improvements in snap fastener studs.

In the drawing which illustrates a preferred embodiment of my invention:—

Figure 1 is a section through an installation showing one use of my improved stud member;

Fig. 2 is a section similar to that shown in Figure 1 but showing the head of the stud compressed as it passes through the stud-receiving aperture;

Fig. 3 is a side elevation of the snap fastener stud;

Fig. 4 is a plan view of the stud shown in Fig. 3; and

Fig. 5 is an end view of the stud shown in Fig. 4.

Referring to the drawing, I have illustrated a preferred embodiment of my improved fastener stud and shown it in use in connection with securing a padding or the like to the "dash" of a motor vehicle or the like. Stud members for certain uses must be provided with relatively long headed shanks which cannot be drawn or pressed from a sheet metal blank in the manner of the ordinary snap fastener stud. Therefore, I have provided a stud which is formed from sheet metal and the shank is folded from the blank.

The particular stud member illustrated is formed from a single piece of metal and has a base 1, a shank having a head 2 and said shank being formed by two opposed yieldable fingers 3. Each finger 3 extends from the edge of the base 1 toward the center, then outwardly at right angles to the general plane of the base, as shown in Figure 1. The stud is of the yieldable type for engagement with a rigid socket means and, therefore, it is desirable to have as stiff a snapping action and holding power as the ordinary short shank stud. If the fingers 3 are spaced from each other throughout the length of the shank the holding power of the head 2 is not satisfactory, because of the great length of the shank, thereby localizing the yield of the fingers at the base 1 and a relatively long distance from the head 2. To overcome this objection I have formed the fingers 3 in such a manner that the cross-section of each finger is greater near the base 1 than at the head 2. Therefore, the edges of the fingers contact for a substantial distance (as at A) from the shank toward the head. Then the edges diverge from each other and are, therefore, spaced from each other (Fig. 3) for the remainder of the length of the shank. When the head 2 of the stud is contracted by forcing it through a stud-receiving aperture (Fig. 2), the yielding of the fingers is spread over a portion of the shank rather than being localized at the base and the hindrance to contraction starts at a point where the edges of the fingers begin to be spaced apart. Thus, the action of the fastener is "stiffened" with a result that the effective holding power is substantially the same as a stud the length of the shank of which is from the point B to the head, while the flexing thereof is controlled, as clearly shown in Figs. 1 and 2, inasmuch as the progressive and gradual decrease of the convexly curved cross section of the shank members from the point B toward the free ends thereof results in progressive extension of the loci of abutment of the edges of the shank members as they are flexed, causing the length of the lines of contact A to increase as shown in Fig. 2, thus limiting the amount of flexing allowed at those portions of the shank adjacent to the point B and shortening the flexing length of the members as their flexure is increased.

In the installation of the fastener stud I have shown in Figures 1 and 2 the head 2 as being snapped through an aperture 4 in a sheet metal portion 5 and the shank passing through a padding or upholstery 6 which is held in place by the base 1 of the fastener.

If desirable, a cap 7 may be attached to the base to provide a finished and neat appearance when the fastener stud is used in an installation such as shown in Figures 1 and 2.

While I have illustrated and described a preferred embodiment of my invention, I do not wish to be limited thereby, because the scope of my invention is best defined by the following claims.

I claim:

1. A snap fastener stud of the type having a base and yieldable shank members extending therefrom to enter a socket and provided with socket-engaging shoulders adjacent their free ends for retaining the stud in place; said yieldable shank members being elongated and formed of sheet metal and being each convexly curved in cross section substantially throughout its length to impart substantial stiffness thereto, said convexly-curved shank members having edge-contacting relation with one another for a substantial distance beginning adjacent the head of the stud to form a hollow tube of substantially fixed size thereat, and said shank members having the width of the convexly curved cross section thereof decreased toward the free ends thereof to effect spacing apart of said free ends and a reduced stiffness adjacent the shoulders thereon, said edge-contacting portions of said shank members limiting the flexing length thereof.

2. A snap fastener stud of the type having a base and yieldable shank members extending therefrom to enter a socket and provided with socket-engaging shoulders adjacent their free ends for retaining the stud in place; said yieldable shank members being elongated and formed of sheet metal and being each convexly curved in cross section substantially throughout its length to impart substantial stiffness thereto, said convexly-curved shank members having edge-contacting relation with one another for a substantial distance beginning adjacent the head of the stud to form a hollow tube of substantially fixed size thereat, and said shank members having the width of the convexly curved cross section thereof progressively and gradually decreased from the normal loci of edge contact thereof toward their free ends, spacing the free ends of the same apart, and providing for progressive extension of the loci of edge contact toward the free ends of the shank members as they are flexed with progressive limiting of the flexing length thereof.

GUSTAV JOHNSON.